United States Patent
Geguine

(10) Patent No.: US 11,016,459 B2
(45) Date of Patent: May 25, 2021

(54) GOVERNANCE OF THE CONTROL PROCESS BY THE STATE OF THE NODE

(71) Applicant: UBICQUIA IQ LLC, Fort Lauderdale, FL (US)

(72) Inventor: Gleb Geguine, Lachine (CA)

(73) Assignee: Ubicquia IQ LLC, Fort Lauderdale, FL (US)

( * ) Notice: Subject to any disclaimer, the term of this patent is extended or adjusted under 35 U.S.C. 154(b) by 5 days.

(21) Appl. No.: 15/646,337

(22) Filed: Jul. 11, 2017

(65) Prior Publication Data
US 2019/0018383 A1   Jan. 17, 2019

(51) Int. Cl.
| | |
|---|---|
| G05B 19/042 | (2006.01) |
| G01J 1/02 | (2006.01) |
| G01J 1/42 | (2006.01) |
| H05B 47/11 | (2020.01) |
| G06F 11/30 | (2006.01) |
| H05B 47/18 | (2020.01) |
| H05B 47/19 | (2020.01) |
| H05B 47/105 | (2020.01) |

(52) U.S. Cl.
CPC ........ *G05B 19/0421* (2013.01); *G01J 1/0228* (2013.01); *G01J 1/4204* (2013.01); *H05B 47/11* (2020.01); G05B 2219/25428 (2013.01); G06F 11/3041 (2013.01); G06F 11/3089 (2013.01); *H05B 47/105* (2020.01); *H05B 47/18* (2020.01); *H05B 47/19* (2020.01)

(58) Field of Classification Search
CPC ... G05B 19/0421; G01J 1/0228; H05B 47/11; H05B 47/115
USPC .......................................................... 700/28
See application file for complete search history.

(56) References Cited

U.S. PATENT DOCUMENTS

| | | | | |
|---|---|---|---|---|
| 6,452,339 | B1 * | 9/2002 | Morrissey | H05B 47/20 |
| | | | | 315/149 |
| 8,456,325 | B1 * | 6/2013 | Sikora | G08G 1/087 |
| | | | | 340/909 |
| 9,449,561 | B1 * | 9/2016 | Umansky | G09G 5/003 |
| 2012/0286673 | A1 * | 11/2012 | Holland | H05B 47/175 |
| | | | | 315/155 |
| 2014/0112537 | A1 * | 4/2014 | Frank | H04N 5/33 |
| | | | | 382/103 |
| 2015/0364948 | A1 * | 12/2015 | Kaag | G05B 15/02 |
| | | | | 700/291 |
| 2017/0055324 | A1 * | 2/2017 | Reed | H05B 37/0218 |

(Continued)

OTHER PUBLICATIONS

Paradis, et al., A Survey of Fault Management in Wireless Sensor Networks, Journal of Network and Systems Management, vol. 15, No. 2, Jun. 2007 DOI: 10.1007/s10922-007-9062-0 (Year: 2007).*

(Continued)

*Primary Examiner* — Mohammad Ali
*Assistant Examiner* — Joshua T Sanders

(57) ABSTRACT

Provided is a control loop and method for monitoring control loops to ensure low cost of commissioning. The method includes collecting a measurement data set from a sensor, determining a state of connectivity of the sensor, selecting parameters based on the state of the connectivity, and/or performing logical operations to evaluate the measurement data set from the sensor. The control loop is configured to determine the measured state of connectivity and determine if action is required.

22 Claims, 5 Drawing Sheets

(56) References Cited

U.S. PATENT DOCUMENTS

2017/0171950 A1* 6/2017 Barna ................ H05B 37/0272

OTHER PUBLICATIONS

Microsoft Corp. Microsoft Computer Dictionary 5th Edition, 5th. ed. Microsoft, 2002. p. 11. (Year: 2002).*
Ramanathan, Nithya, et al. "A Debugging System for Sensor Networks." (2005). UCLA, Center for Embedded Network Sensing, eScholarship.org; retrieved from https://escholarship.org/uc/item0r31h0vp on Oct. 27, 2019 (Year: 2005).*

* cited by examiner

Governance of the Control Process by the State of the Node

TECHNICAL FIELD

The present disclosure relates to monitoring collapsible control loops within a control system. In particular, the present disclosure relates to performing logical operations analysis to assess measured states of connectivity within a control loop and determining if action is required.

BACKGROUND

The Internet of things (IoT) is the inter-networking of physical devices embedded with software, sensors, actuators, network connectivity, etc. that enable these devices (objects) to collect and exchange data. The IoT facilitates remote sensing and control of these objects.

By way of background, the IoT includes domain edge nodes that are network sensing and measurement entry locations: points of interaction between the physical world and computational data analytics. The domain edge nodes fulfill different functionality, from data collection to logic control. The logic control can be based on local data, as well as data collected by other nodes. IoT data communication and connectivity, however, can be unreliable. As a result, the data collected by the other nodes may only be intermittently available.

In various general control systems, only positive communication and connectivity changes are transmitted. Thus, it is impossible to distinguish between the absence of change and actual communication errors. For example, in lighting control systems, one sensor monitors ambient light levels and determines if additional lighting is needed. However, if the sensor is somehow obstructed from receiving ambient light level signals, output from a light data source, a false negative reading can occur.

Thus, the manner in which the node is configured will make some data sources that are connected nearby, or connected to the node directly, appear or disappear due to physical or analytical changes. This occurrence can increase the physical, operational, and/or commissioning costs of the system. Also, resolving ambiguities or other situations created by false negative readings typically require costly and time consuming human intervention.

BRIEF SUMMARY

Given the aforementioned deficiencies, a need exists for an increase in the reliability of IoT data communication systems capable of functioning without human intervention. Additionally, a need exists for a system capable of differentiating reuse between the absence of change and communication errors. A need also exists for a system having Low physical, operational, and commissioning costs.

One embodiment of the present invention includes a method for collecting a measurement data set from a sensor, determining a state of connectivity of the sensor, selecting parameters based on the state of the connectivity, and/or performing logical operations to evaluate the measurement data set from the sensor.

Embodiments of the present invention provide collapsible control loops, or series of control logic that include an evolving circle of the data organized based upon the reliability of information. For example, in lighting control—one loop involves a local ambient light sensor (ALS) and another loop involves a clock source and schedule. Yet another loop involves a local area integrator, where light states are defined by voting participants), and one other loop is cloud based control.

In exemplary embodiments, each loop includes a monitoring flag for determining availability of data. For example, a local sensor is valid if the system has observed it detecting outside light state change in the last 24 hours, gateway connectivity is active, and the back-haul tunnel is up, etc. Data availability determinations are performed in accordance with loop validity factors. These loop validity factors are evaluated by the system in background road, alerting the priority of the control logic. That process enables the system to react quickly to input changes, while at the same time, providing the best possible outcome at any point.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
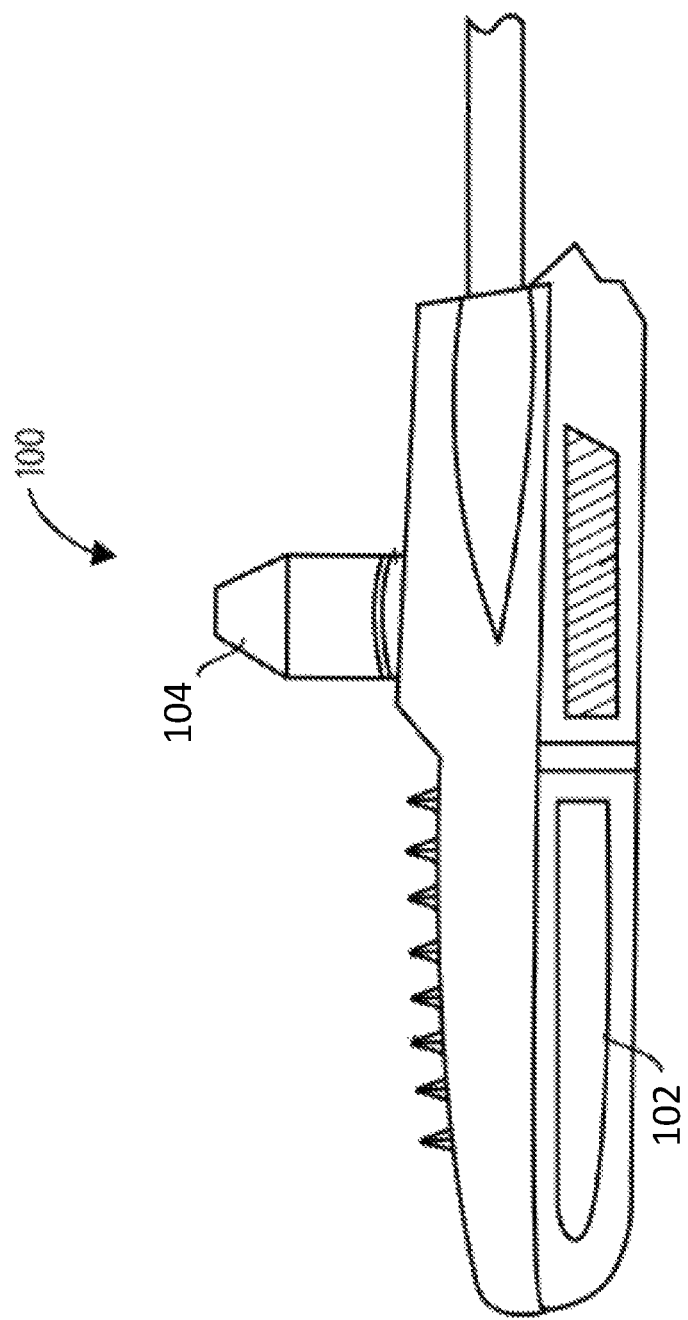
FIG. 1 illustrates a an exemplary luminaire in which embodiments of the present invention can be practiced.

Aggregator in this context refers to a website or program that collects related items of content and displays them or links to them.

Collapsible control loop in this context refers to a control system that has at least two separate governing control laws. At least one control law includes logic and/or information originated at a separate entity distinct from the entity that hosts the control system. The other control law is based on the logic and information that resides at the same entity as the control system.

Control law in this context refers to the segment of a software program that determines the next actuation step in response to user commands and acquired sensors data according to a predefine logic.

Control system in this context refers to a system that manages, commands, directs, and regulates the behavior of the devices comprised in the system. In a closed loop control system, the control action from the controller is dependent on the desired and actual process output values. Logic controllers may respond to switches, light sensors, pressure switches, and can cause devices to start or stop various operations.

Node in this context refers to an active electronic device that is attached to a network, and is capable of creating, receiving, or transmitting information over a communication channel. The node may be a data communication equipment, such as a modem, hub, bridge, or switch. The node may also be a data terminal equipment such as a digital telephone handset, a printer, or a host computer (workstation, or router etc.).

"Peer" in this context refers to an adjacent network node, an aggregator, a cloud, etc.

"Connection state" in this context refers to the connectivity to the other possible peer or the underlying means of connection.

"Subsystem," in this context, refers to a smaller self-contained system within a broader system. In this context subsystem boundaries are defined based on the connectivity interfaces. Subsystem resides within an entity that provides uniform latency of communication between its components.

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Reference will be made below in detail to exemplary embodiments of the inventive subject matter, examples of which are illustrated in the accompanying drawings. Wherever possible, the same reference numerals used throughout the drawings refer to the same or like parts.

FIG. 1 illustrates an exemplary luminaire 100, in which embodiments of the present invention can be practiced. The luminaire 100 can include one or more light sources, such as light emitting diodes (LEDs located in a cavity 102 of luminaire 100. A controller module 104, including at least one computer processor (discussed in greater detail below) and sensors, provides a plurality of functionalities to the luminaire 100. By way of example, the sensors can measure light, sound, motion etc.

Figure 2:
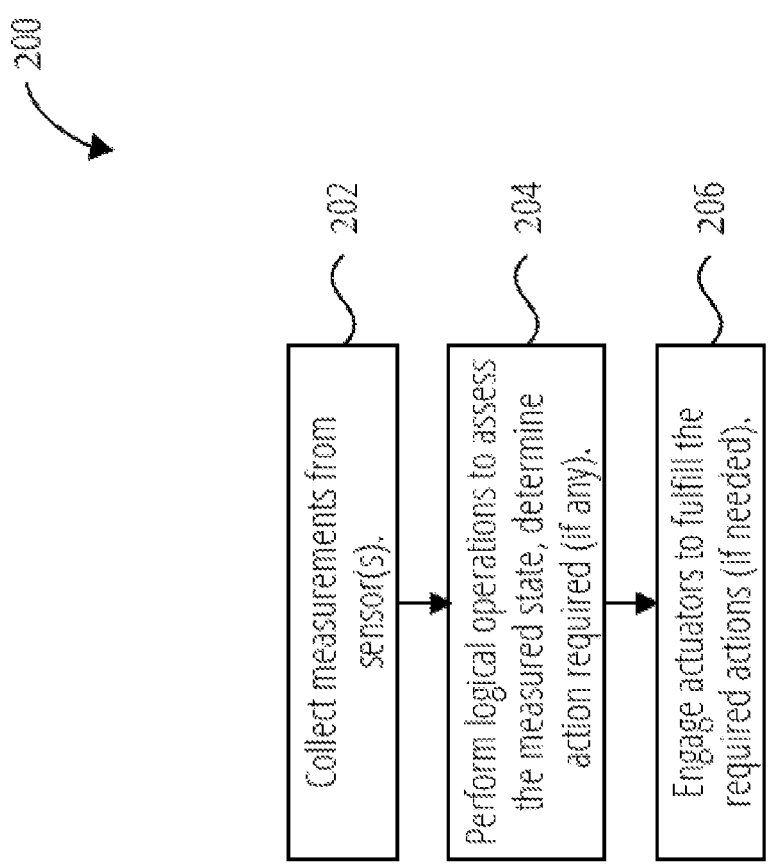
FIG. 2 is a flow chart of a conventional control loop.

FIG. 2 is a flowchart of a conventional control system (i.e. loop) method 200, for example, implemented within the controller module 104 of FIG. 1. The controller module 104 can be standalone, or can be a single component of a broader control system. In the method 200, the sensors collect measurements in block 202. Collected measurements can include lighting, sound, motion, detection of objects, detection of individuals, etc. The control loop performs logical operations to assess the measured state, and determine if any action is required in block 204.

If action is required, the control system engages an actuator, or multiple actuators, to complete the required actions in block 206. One drawback to the method 200 is that it cannot distinguish between negative measurements and system errors. As described below, embodiments of the present invention can distinguish between negative measurements and system errors.

Figure 3:
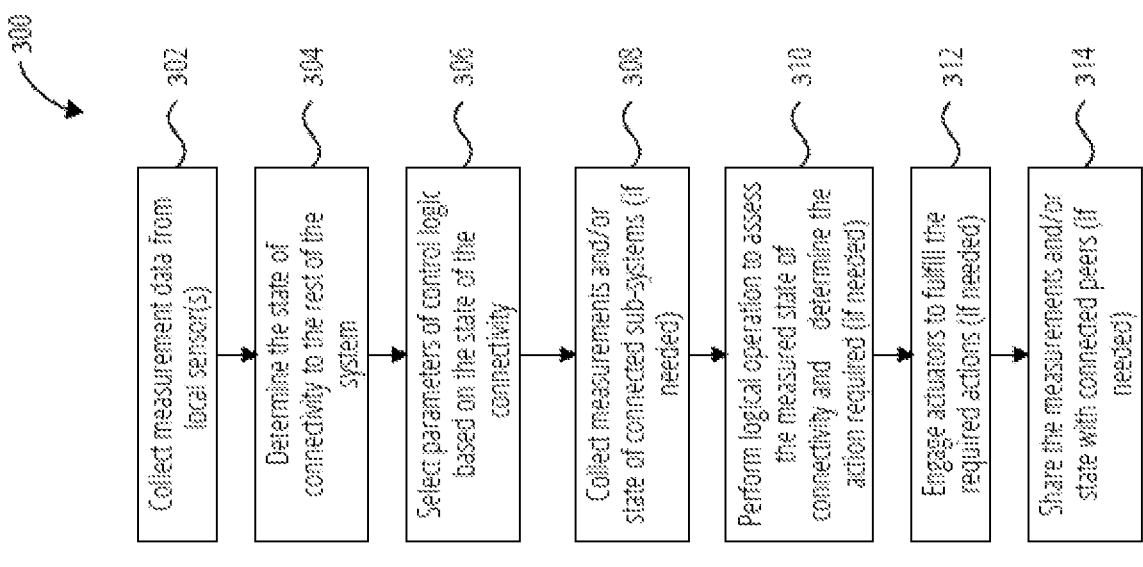
FIG. 3 is a flowchart of an exemplary method of practicing an embodiment of the present invention.

FIG. 3 is a flow chart of an exemplary method 300 of practicing an embodiment of the present invention. The method 300 can be implemented within the controller 104 of FIG. 1. In the method 300, the sensors collect measurements in block 302. By way of example, the measurements collected by the sensor may include lighting, sound, motion, detection of objects, detection of individuals, etc. The control system determines the state of connectivity of the sensor in block 304. For example, the system and/or system node performs analysis to determine if the sensor is properly connected. The system also performs analysis to determine if the sensor is functioning properly. The results of this analysis can be used to determine if the sensor is obstructed, or otherwise functioning and properly.

One benefit of this analysis is that the system can determine if there are false negative readings. After the state of connectivity it is determined, the system selects parameters for control logic based on the state of connectivity in block 306. For example, if a determination is made that the sensor is not properly connected to the system, an alert can be provided indicating an improper sensor connection. Furthermore, if the system is wirelessly connected, it may self-correct the connectivity issue. Measurements and/or states of connected sub-systems are collected in block 308.

The control system performs a logic operation to assess the measured state of connectivity and determine the action required in block 310. For example, if the system determines the sensors are properly connected and there is an absence of ambient light, a signal can be transmitted to the actuator to activate a light switch in block 312. The system can also share the measurements and/or state with connected peers, as shown in block 314. In some embodiments, peers are nodes connected to the system that 10 create or gather information from the sensor.

Figure 4:
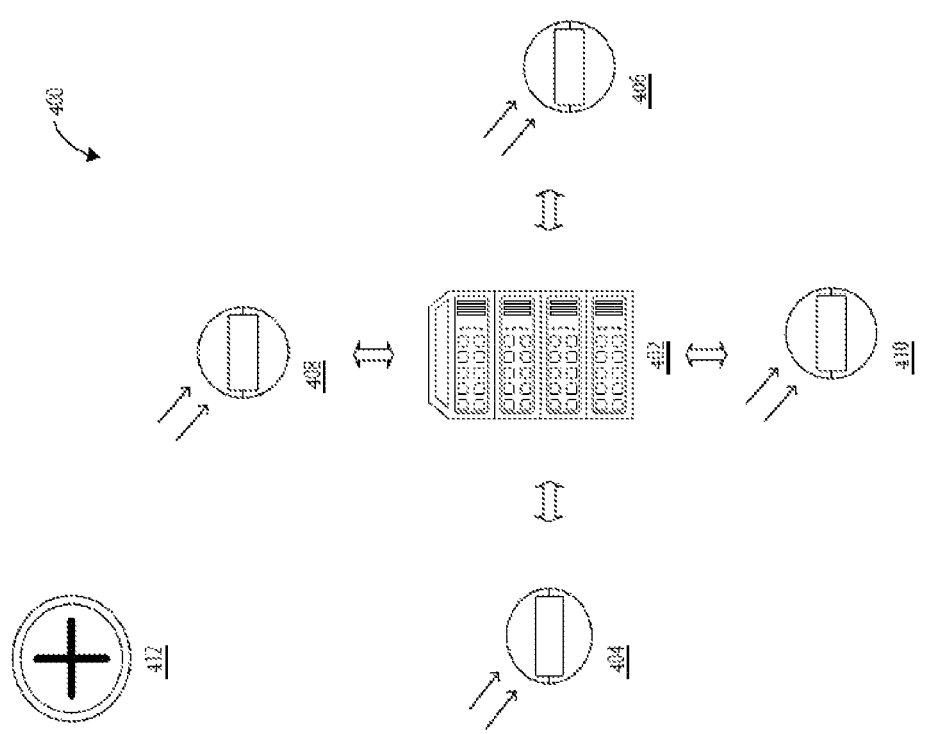
FIG. 4 is an illustration of an exemplary control loop system constructed in accordance with the embodiments.

FIG. 4 is a more detailed illustration of an illustration of an exemplary control loop 400 implemented, as an example, within the controller module 104. In some embodiments, the control loop 400 may be cloud based. The system 400 includes a node 402, sensors 404, 406, 408, 410, and an actuator 412. The node 402 can include a computer or computer controller. The control loop 400 can have an infinite number of sensors (404, 406, 408, 410) nodes 402, and actuators 412.

By way of example, the node 402 is communication with the sensors 404, 406, 408, 410. In one exemplary embodiment, the control loop 400 can include the node 402, the sensor 404, and the actuator 412. In another embodiment, the control loop 400 can include an unlimited number of sensors, nodes, and actuators.

The node 402 (e.g., multiple nodes) is collecting measurements from the local sensors 404, 406, 408, and 410. The control loop 400 can determine the state of connectivity of the sensors 404, 406, 408, and 410. If the sensors 404, 406, 408, and 410, are connected to the system 400, and the system 400 determines that action is required, the actuator 412 is engaged accordingly.

For example, the actuator 412 can be used to turn on a light or adjust a thermostat. By way of example, and not limitation, the node 402, and the sensors 404, 406, 408, 410 can be housed within a controller module, such as the controller module 104 of FIG. 1. In some embodiments, a control loop may include a node 302, a first sensor 304, and an actuator 312.

For example, if the control loop 400 was monitoring ambient light levels. The sensor 404, etc. would consistently monitor for ambient light. For example, the sensor 404 can be configured to monitor ambient light at a point within the control loop. When the sensor 404 no longer detects ambient light, the control loop 400 can perform an analysis to determine the connectivity of the sensors 404.

If the analysis indicates the sensor 404 was properly connected and the ambient light level was low or nonexistent, the system can engage the actuator 412 to activate lights from a light source. By way of example, the activator 412 can be controlled via software.

Figure 5:
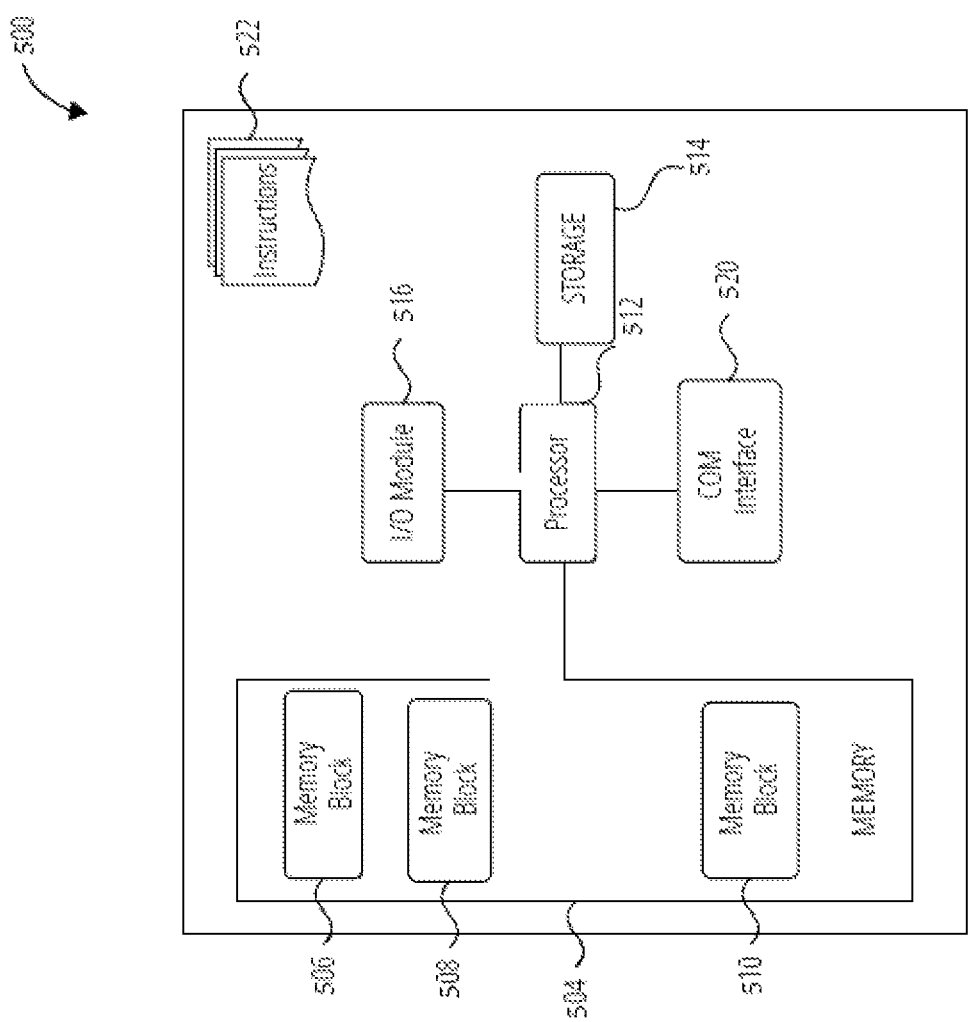
FIG. 5 is an illustration of a block diagram illustration of a computer on which embodiments of the present invention may be implemented.

FIG. 5 is a detailed block diagram of a computer controller 500 within the node 402. The computer controller 500 includes a memory 504 formed of several memory blocks 506, 508, 510, a processor 512, and storage medium 514. The computer controller 500 also includes an input output (I/O) module 516, a communications interface 520, and instructions 522 configured for execution within the computer controller 500. There may be one or more processor units 512. The storage medium 514 may be co-located with the controller, or it may be located elsewhere and be communicatively coupled to controller 500.

The controller 500 may be a stand-alone programmable system, or it may be a programmable module located in a much larger system. The controller 500 may include one or more hardware and/or software components configured to fetch, decode, execute, store, analyze, distribute, evaluate, and/or categorize information. Furthermore, the controller 500 may include an I/O module 516 that can be configured to interface with other devices within the system 300.

The processor 512 may include one or more devices or cores, such as a central processing unit (CPU) and a graphics processing unit (GPU). In some embodiments, the processor 512 may be a plurality of processors, each having either one or more cores. The processor 512 may be configured to execute the instructions fetched 522 from the memory 504, either of the memory blocks 506, 508, 510, storage medium 514, or a remote device connected to the controller 500 via a communication interface 520.

The storage medium 514 and/or memory 504 may include programs and/or other information that may be used in the processor 512. The storage medium 514 may be configured to log data processed, recorded, or collected during the operation of the controller 500. The data may be time-stamped, location-stamped, cataloged, indexed, or organized in a variety of ways consistent with data storage practice. The memory block 510 may include additional instructions, that when executed by the processor 512, cause processor 512 to perform certain operations.

In some embodiments, a change in the logic can constitute a completely different method (majority voting versus a solely local decision), or a change in the parameter of the decision technique. For example, the local balance between a false positive and a false negative may be changed if a final decision is based on a combination of individual inputs.

Embodiments of the present invention require sufficient processing capability to perform real-time correlation and analysis of audio, video, and electromagnetic data samples. Although off the shelf microprocessor chipsets may be used within node 302, specially programmed CPUs and GPUs may offer considerable advantages for I/O.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method executed by a processor of a streetlight-mounted controller, comprising:
   collecting a first measurement data set from a first sensor of the streetlight-mounted controller arranged to detect light;
   collecting a second measurement data set from a second sensor of the streetlight-mounted controller arranged to capture video data;
   determining a state of connectivity of the first sensor, wherein determining the state of connectivity of the first sensor includes determining whether the first sensor has detected an ambient light change within a predetermined time period;
   selecting parameters based on the state of the connectivity;
   performing logical operations to evaluate the first measurement data set from the first sensor based on the parameters, wherein the logical operations include correlating the first measurement data set with the second measurement data set;
   if the correlation indicates the ambient light change occurred within the predetermined time period, but the first sensor did not detect the ambient light change within the predetermined time period, then engaging an actuator and providing an alert indicating an incorrect first sensor connection state; and
   if the first sensor detected the ambient light change within the predetermined time period then engaging the actuator.

2. The method of claim 1, further comprising collecting a sub-system measurement data set.

3. The method of claim 2, further comprising performing logical operation to evaluate the sub-system measurement data set.

4. The method of claim 1, wherein the actuator is configured to activate a light source.

5. The method of claim 1, further comprising sharing the first measurement data set with connected peers.

6. The method of claim 1, wherein the first sensor is configured to monitor ambient light.

7. The method of claim 1, wherein the logic operations are performed on a node.

8. The method of claim 1, wherein the first sensor is configured to communicate with a node.

9. The method of claim 1, wherein determining a state of connectivity of the first sensor further comprises an observation of the first sensor detecting ambient light change within a last 24 hours, or comprises an observation that a gateway connectivity is active, or comprises an observation that a backhaul tunnel is up.

10. The method of claim 1, comprising:
    receiving a third measurement data set generated by a third sensor arranged to detect motion, the third sensor being a peer of the streetlight-mounted controller; and
    distinguishing whether the motion is associated with the motion of an object or motion of an individual based on data in the third measurement data set.

11. The method of claim 1, further comprising:
    collecting a third measurement data set from a third sensor arranged to detect motion; and
    distinguishing, based on data in the third measurement data set, whether the motion is associated with motion of an object or motion of an individual.

12. The method of claim 11, wherein the third measurement data set is received from a peer.

13. A control system, comprising:
    a plurality of streetlight control devices each mounted, respectively, on one of a plurality of streetlights, each streetlight control device having an actuator, at least two sensors, at least one processor, and memory, wherein the memory stores processor-executable instructions, which, when executed, cause the respective streetlight control device to:
collect a first measurement data set from a first sensor arranged to detect light;
collect a second measurement data set from a second sensor arranged to capture video data;
determine a state of connectivity of the first sensor, wherein the state of connectivity indicates whether the first sensor has detected an ambient light change within a predetermined time period;
select parameters based on the state of the connectivity;
perform logical operations to evaluate the first measurement data set from the first sensor based on the parameters, wherein the logical operations include correlating the first measurement data set with the second measurement data set;
engage the actuator and provide an alert indicating an incorrect first sensor connection state if the correlation indicates the ambient light change occurred within the predetermined time period, but the first sensor did not detect the ambient light change within the predetermined time period; and
engage the actuator if the first sensor did detect the ambient light change within the predetermined time period.

14. The control system of claim 13, comprising:
wherein the memory stores further processor-executable instructions, which, when executed, cause the respective streetlight control device to:
collect a third measurement data set from a third sensor arranged to detect motion; and
distinguish, based on data in the third measurement data set, whether the motion is associated with motion of an object or motion of an individual; and
a peer node arranged to receive communications from at least some of the plurality of streetlight control devices, wherein the peer node has at least one processor arranged to execute instructions that cause the peer node to:
receive data from the third measurement data set of a first streetlight control device;
receive data from the third measurement data set of a second streetlight control device; and
further distinguish, at the peer node, whether the motion is associated with the motion of the object or motion of the individual based on data from the first and second streetlight control devices.

15. The control system of claim 14, wherein the at least one processor of the peer node is further arranged to determine if a certain sensor of a certain streetlight control device is obstructed.

16. The control system of claim 14, wherein the peer node is a remote host computer system arranged to perform real-time correlation of video data.

17. The control system of claim 13, wherein the memory stores further processor-executable instructions, which, when executed, cause the respective streetlight control device to determine if the second sensor is obstructed.

18. The control system of claim 13, wherein the memory stores further processor-executable instructions, which, when executed, cause the respective streetlight control device to perform a self-correction of at least one associated sensor.

19. A streetlight control device, comprising:
an actuator subsystem arranged to control a streetlight light source;
a first sensor subsystem arranged to detect light;
a second sensor subsystem arranged to capture video data;
a communications interface arranged to communicate with at least one network peer device;
a processor subsystem; and
a memory subsystem, wherein the memory subsystem is arranged to store processor-executable instructions, which, when executed, cause the processor subsystem to:
collect a first measurement data set from the first sensor subsystem;
collect a second measurement data set from the second sensor subsystem;
determine a state of connectivity of the first sensor subsystem, wherein the state of connectivity indicates whether the first sensor subsystem has detected an ambient light change within a predetermined time period;
select parameters based on the state of the connectivity;
perform logical operations to evaluate the first measurement data set from the first sensor subsystem based on the parameters, wherein the logical operations include a correlation of the first measurement data set with the second measurement data set;
engage the actuator subsystem and provide an alert indicating an incorrect first sensor subsystem connection state if the correlation indicates the ambient light change occurred within the predetermined time period, but the first sensor subsystem did not detect the ambient light change within the predetermined time period; and
engage the actuator subsystem if the first sensor did detect the ambient light change within the predetermined time period.

20. The streetlight control device of claim 19, wherein the memory subsystem is arranged to store further processor-executable instructions, which, when executed, cause the processor subsystem to determine if the first sensor subsystem or the second sensor subsystem is obstructed.

21. The streetlight control device of claim 19, wherein the memory subsystem is arranged to store further processor-executable instructions, which, when executed, cause the processor subsystem to perform a self-correction of at least one associated sensor subsystem.

22. The control system of claim 19, wherein the at least one network peer device is a remote host computer system arranged to perform real-time correlation of video data.

* * * * *